US009407694B2

(12) United States Patent
Sultenfuss et al.

(10) Patent No.: US 9,407,694 B2
(45) Date of Patent: Aug. 2, 2016

(54) SYSTEM AND METHOD OF POLLING WITH AN INFORMATION HANDLING SYSTEM

(75) Inventors: Andrew T. Sultenfuss, Leander, TX (US); David Loadman, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 1097 days.

(21) Appl. No.: 12/261,626

(22) Filed: Oct. 30, 2008
(Under 37 CFR 1.47)

(65) Prior Publication Data
US 2010/0115050 A1 May 6, 2010

(51) Int. Cl.
G06F 15/173 (2006.01)
H04L 29/08 (2006.01)
H04L 29/06 (2006.01)
H04W 4/00 (2009.01)
H04W 4/02 (2009.01)

(52) U.S. Cl.
CPC ............ H04L 67/1095 (2013.01); H04L 67/18 (2013.01); H04L 69/28 (2013.01); H04W 4/001 (2013.01); H04W 4/02 (2013.01)

(58) Field of Classification Search
USPC ......................................... 709/224
See application file for complete search history.

(56) References Cited

U.S. PATENT DOCUMENTS

| 4,720,798 | A | 1/1988 | Reed et al. |
|---|---|---|---|
| 5,303,171 | A | 4/1994 | Belt et al. |
| 5,586,270 | A | 12/1996 | Rotier et al. |
| 5,644,760 | A | 7/1997 | Polzin et al. |
| 5,727,231 | A | 3/1998 | Bartley et al. |
| 5,748,912 | A | 5/1998 | Lee |
| 5,999,997 | A | 12/1999 | Pipes |
| 6,029,211 | A | 2/2000 | Nakashima |
| 6,078,967 | A | 6/2000 | Fulghum |
| 6,411,825 | B1 | 6/2002 | Csapo et al. |
| 6,549,968 | B1 | 4/2003 | Hart |
| 6,640,268 | B1 * | 10/2003 | Kumar ............................ 710/46 |
| 6,735,663 | B2 | 5/2004 | Watts, Jr. |
| 6,735,708 | B2 | 5/2004 | Watts, Jr. |
| 6,801,974 | B1 | 10/2004 | Watts, Jr. et al. |
| 6,816,925 | B2 | 11/2004 | Watts, Jr. |
| 6,826,391 | B2 | 11/2004 | Lienonen et al. |
| 7,149,837 | B2 | 12/2006 | Watts, Jr. et al. |
| 7,197,584 | B2 | 3/2007 | Huber et al. |
| 7,212,250 | B1 | 5/2007 | Neal |
| 7,268,755 | B2 | 9/2007 | Selwan |
| 7,305,501 | B2 | 12/2007 | Lee |

(Continued)

FOREIGN PATENT DOCUMENTS

EP 1 460 529 A2 9/2004
WO WO 2007/004178 A1 1/2007

OTHER PUBLICATIONS

U.S. Appl. No. 12/039,872, filed Feb. 29, 2008.

(Continued)

Primary Examiner — Kyung H Shin
(74) Attorney, Agent, or Firm — Larson Newman, LLP

(57) ABSTRACT

An information handling system is configured to poll a remote data store at an adaptable polling rate. The polling rate can be based on one or more usage characteristics of the information handling system, such as a time of day, geographical location, user profile, management profile, system usage pattern, or other usage characteristic. Between polling requests, the information handling system can be placed in a low-power mode, thereby conserving power.

18 Claims, 4 Drawing Sheets

(56) References Cited

U.S. PATENT DOCUMENTS

| | | |
|---|---|---|
| 7,636,560 B2 | 12/2009 | Ku |
| 7,720,506 B1 | 5/2010 | Gribble |
| 2002/0103005 A1 | 8/2002 | Watts, Jr. et al. |
| 2003/0110306 A1 | 6/2003 | Bailis et al. |
| 2003/0135803 A1 | 7/2003 | Hong |
| 2003/0176176 A1 | 9/2003 | Leinonen et al. |
| 2004/0063425 A1 | 4/2004 | Wakutsu et al. |
| 2004/0088262 A1 | 5/2004 | Boucher et al. |
| 2004/0160435 A1 | 8/2004 | Cui et al. |
| 2004/0162107 A1 | 8/2004 | Klemetti et al. |
| 2004/0203709 A1 | 10/2004 | Luneau |
| 2004/0219932 A1* | 11/2004 | Verteuil ............... 455/456.2 |
| 2005/0066006 A1* | 3/2005 | Fleck et al. ............... 709/206 |
| 2005/0138267 A1 | 6/2005 | Bains et al. |
| 2005/0240702 A1 | 10/2005 | Kunkel et al. |
| 2006/0079275 A1 | 4/2006 | Ella et al. |
| 2007/0056000 A1 | 3/2007 | Pantalone et al. |
| 2007/0094435 A1 | 4/2007 | Fry et al. |
| 2007/0103836 A1 | 5/2007 | Oh |
| 2007/0110393 A1 | 5/2007 | Jang |
| 2007/0168763 A1 | 7/2007 | Sauber et al. |
| 2007/0213105 A1 | 9/2007 | Huber et al. |
| 2008/0004889 A1 | 1/2008 | Edwards et al. |
| 2008/0034238 A1 | 2/2008 | Hendry et al. |
| 2008/0070593 A1* | 3/2008 | Altman et al. ............... 455/457 |
| 2008/0100712 A1 | 5/2008 | Hayes et al. |
| 2008/0140872 A1 | 6/2008 | Wright |
| 2008/0183857 A1* | 7/2008 | Barfield et al. ............... 709/224 |
| 2008/0272880 A1 | 11/2008 | Sutardja et al. |
| 2010/0036983 A1 | 2/2010 | Utz et al. |
| 2010/0107238 A1 | 4/2010 | Stedman et al. |
| 2010/0115303 A1 | 5/2010 | Stedman et al. |
| 2010/0115313 A1 | 5/2010 | Belt et al. |
| 2011/0052142 A1 | 3/2011 | Sultenfuss et al. |

OTHER PUBLICATIONS

U.S. Appl. No. 12/189,005, filed Aug. 8, 2008.
U.S. Appl. No. 12/188,994, filed Aug. 8, 2008.
U.S. Appl. No. 12/189,006, filed Aug. 8, 2008.
U.S. Appl. No. 12/189,000, filed Aug. 8, 2008.
U.S. Appl. No. 12/260,519, filed Oct. 29, 2008.

* cited by examiner

SYSTEM AND METHOD OF POLLING WITH AN INFORMATION HANDLING SYSTEM

FIELD OF THE DISCLOSURE

This disclosure relates generally to information handling systems, and more particularly to systems and methods for polling with an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
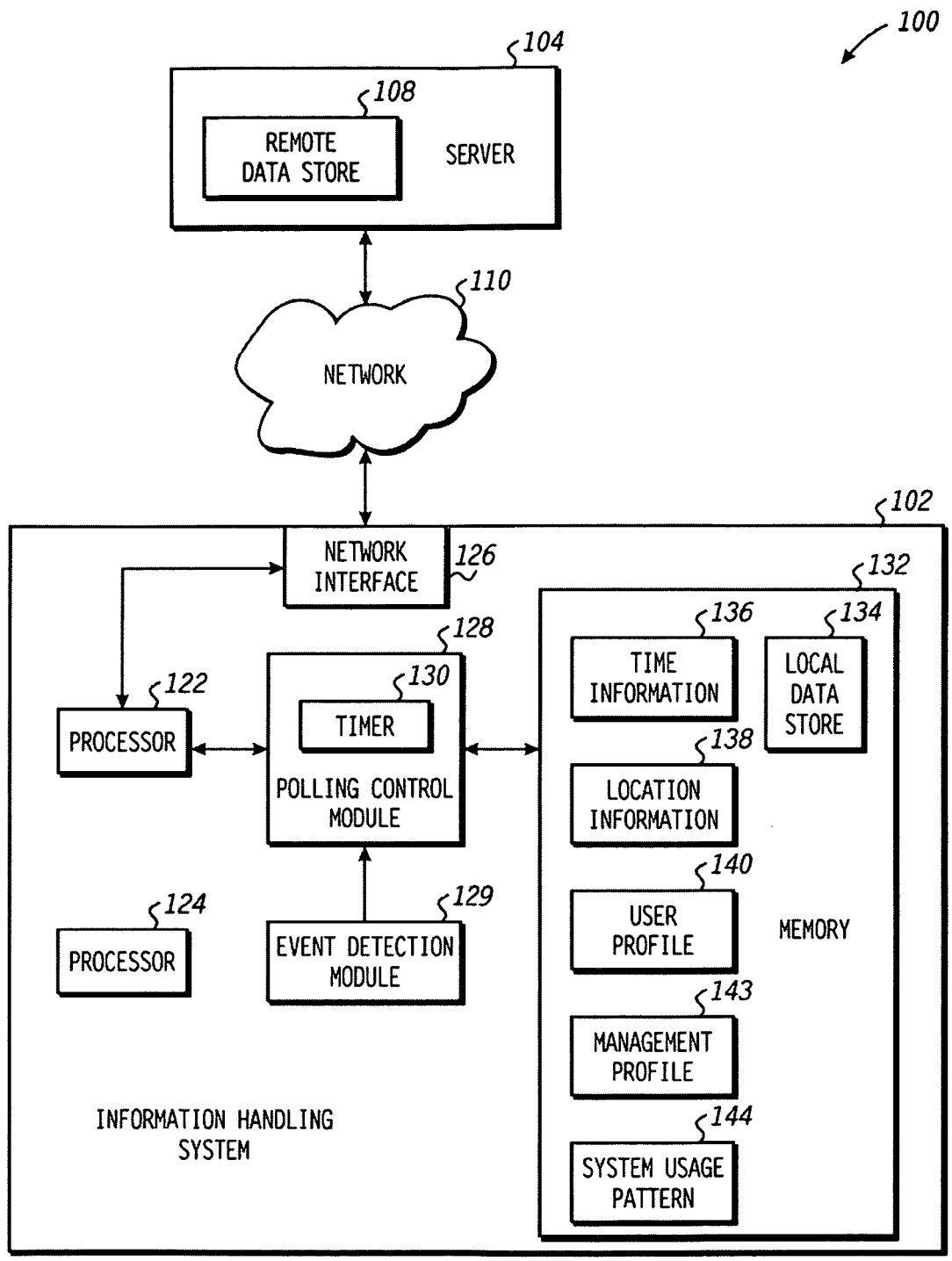
FIG. 1 illustrates a block diagram of a data communication network according to one aspect of the present disclosure.

FIG. 1 illustrates a block diagram of a data communication network 100 in accordance with one embodiment of the present disclosure. The data communication network 100 includes an information handling system 102 and a server 104, each connected to a network 110. The server 104 stores a remote data store 108. The information handling system 102 includes processors 122 and 124, a network interface 126, a polling control module 128, an event detection module 129, and a memory 132. The processor 122 is connected to the polling control module 128 and the network interface 126. The polling control module 128 is configured to access information stored at the memory 132. The memory 132 stores a local data store 134, time information 136, location information 138, a user profile 140, a system usage pattern 142, and a management profile 143. The event detection module 129 is connected to the polling control module 128.

The network 110 is a communication network configured to provide a physical and logical medium for communications between the server 104 and the information handling system 102. In an embodiment, the network 110 is a packet-switched network that communicates information by routing packets between routing equipment such as servers, routers, or the like. In another embodiment, the network 110 is a cellular or other wireless communication network.

The server 104 is an information handling system configured to communicate with one or more client systems via the network 110. In particular, the server 104 is configured to receive polling requests from client systems. As used herein, a polling request refers to a communication to determine whether a data store, such as remote data store 108, includes information not included in another data store, such as local data store 134. In response to a polling request, the server 104 determines whether the remote data store 108 includes information that is not included in a local data store at the remote device. For purposes of discussion, information located at the remote data store 108 that is not also stored at remote data store of the requesting device is referred to herein as "unsynchronized information." If the server 104 determines that the remote data store 108 does not include unsynchronized information, the server 104 so indicates by sending a response communication to the requesting client system. If the server 104 determines that the remote data store 108 does include unsynchronized information, it can communicate the unsynchronized information via the network 110 in response to the polling request.

For example, in one embodiment, remote data store 108 stores email messages for a designated user. In response to a polling request from a client system associated with the user, the server 104 determines whether the remote data store 108 includes any messages that are not stored at a local data store of the client system. For example, the server 104 can determine if any email messages have been stored at the remote data store 108 since the last time the remote data store was synchronized with the local data store. If the remote data store 108 does include email messages not stored at the local data store, the server 104 can communicate those messages to the client system in response to the polling request. In other embodiments, the remote data store 108 can store diagnostic information, security information, computer virus information, user credential information, geofencing information, time zone information, or the like.

The information handling system 102 is a client system configured to communicate polling requests to the server 104 via the network 110. In particular, the network interface 126 provides a physical and logical layer interface for communications with the network 110. The processor 122 is a data processing device configured to execute designated tasks based on specified instructions included in a computer program, such as an application program, BIOS, or other set of computer instructions. One such task includes communicating polling requests via the network 110 to ensure that the local data store 134 is intermittently synchronized with the remote data store 108.

The rate of polling requests communicated by the processor 122 is controlled by the polling control module 128. In particular, the polling control module 128 includes a timer 130. Polling control module 128 can initialize the timer 130 by storing a time value at the timer. Timer 130 is periodically adjusted based on a clock signal (not shown). In response to timer 130 reaching a particular threshold value, polling control module 128 sends an indicator, such as an interrupt request, to the processor 122. In response to the indicator, processor 122 communicates a polling request to network interface 126, which in turn communicates the request to server 104 via network 110. In addition, in response to providing the indicator, the polling control module can re-initialize the timer with another time value. By repeatedly initializing the timer with a time value in response to triggering each polling request, the polling control module 128 ensures that polling requests are periodically communicated. The rate of polling requests is determined by the time value used by polling control module 128 to initialize and re-initialize the timer 130. For purposes of discussion, this time value is referred to as the "initial time value."

Polling control module 128 is configured to determine the initial time value based on one or more of a number of usage characteristics of the information handling system 102. As used herein, a usage characteristic is a characteristic indicating the environment in which an information handling system has been or is being used, or indicating how the information handling system has been used by one or more users. Examples of usage characteristics include the time of day or other time information, geographical location of the information handling system 102, a usage pattern of the information handling system 102, and a user profile associated with a particular user. The polling control module 128 determines the usage characteristic based on one or more of the time information 136, the location information 138, the user profile 140, the system usage pattern 142, and the management profile 143.

For example, the time information 136 indicates a current time of day or other time information based on a system clock or other time sensor. The polling control module 128 can access the time information 136 to set the initial time value, and therefore the polling request rate. Thus, for example, if the time information 136 indicates that the current time of day is a time when the user of the information handling system 102 is not likely to need frequent synchronization of the local data store 134, the polling control module 128 can set the initial time value so that the rate of polling requests is relatively low. In contrast, if the time information 136 indicates that the current time of day is a time when the user is likely to desire frequent synchronization of the local data store 134, the polling control module 128 can set the initial time value so that the rate of polling is relatively high. Thus, for example, the polling control module 128 can set the rate of polling so that it is relatively high during work hours, and relatively low at night.

Location information 138 indicates a geographic or other location of the information handling system 102. In an embodiment, the information handling system 102 can set the location information 138 based on information received from a position sensor (not shown), such as a Global Positioning System (GPS) sensor. The polling control module 128 can access the location information 138 to determine the rate of polling. Thus, for example, if the location information 138 indicates that the information handling system 102 is located at the user's office, polling control module 128 can set the polling rate to a relatively high rate, while if the location information 138 indicates that the information handling system 102 is located at the user's home, the polling control module can set the polling rate to a relatively low rate.

The polling control module 128 can also use the location information 138 in conjunction with the time information 136 to determine the polling rate. For example, the polling control module 128 can determine the current time zone based on the location of the information handling system 102, as indicated by the location information 138. The polling control module 128 can also determine the time of day based on the time information 136, and determine, based on the time zone, whether the current time is night time, day time, or other time of day. The polling control module 128 can then set the polling rate based whether the current time is night time, day time, or other time of day.

System usage pattern 142 indicates a historical usage pattern for the information handling system 102. For example, system usage pattern 142 can indicate at what times of day information handling system 142 is more frequently used by the user. System usage pattern 142 can also indicate the frequency with which particular programs are used. Thus, system usage pattern 142 can provide an indication of how often local data store 134 is accessed at different times of the day. Based on the system usage pattern 142, as well as other information such as time information 136, the polling control module 128 can set the polling rate. For example, the polling control module 128 can reduce the polling rate at times when the system usage pattern 142 indicates the local data store 134 is likely to be accessed relatively infrequently, and increase the polling rate at times when the system usage pattern 142 indicates the local data store 134 is likely to be accessed relatively frequently. In an embodiment, the system usage pattern 142 can indicate different usage patterns for different users, so that the polling rate can be set for each individual user based on the usage pattern for that user. In addition, the information handling system 102 can update the system usage pattern 142 in response to a user's interactions with the system. Thus, as a user changes her usage pattern of the information handling system 102, the system usage pattern 142 can be updated, thereby changing the polling rate set by the polling control module. The polling rate is thereby adapted to each user's usage pattern for the information handling system 102.

The user profile 140 is information associated with a particular user of information handling system 102, and can indicate desired polling rates for the user based on particular user characteristics. Thus, the user profile 140 can indicate that the user desires more frequent polling requests at a particular time of day or when the information handling system 102 is in a particular location. Polling control module 128 can set the polling rate based on the information stored at user profile 140 in conjunction with other information, such as time information 136 and location information 138. In addition, user profile 140 can be adjusted by the user via an interface program (not shown), to allow the user to set polling rates to a desired rate when particular usage characteristics are present. Multiple user profiles can be stored for a particular user, and different user profiles can be stored for different users. Thus, the polling rate can be set for each user according to the user's associated user profile. Further, the information handling system 102 can update the system usage pattern 142 in response to a user's interactions with the system. Thus, as a user changes the way he interacts with his usage pattern of the information handling system 102, the user profile 140 can be automatically updated, thereby changing the polling rate set by the polling control module. The polling rate is thereby adapted to each user's profile for the information handling system 102.

The management profile 143 is information associated with a group or groups of users of the information handling system 102. In particular, the management profile 143 can indicate different classes of users, and the users that are included in each class. Further, the management profile 143 can indicate polling policies for each class of user. Based on the polling policies, as well as other information such as time information 136, the polling control module 128 can set the polling rate. For example, the polling control module 128 can reduce the polling rate at times when the management profile 143 indicates the user is associated with a designated class, and the designated class is associated with a polling policy indicating a lower polling rate. The polling policies can also indicate different polling policies for different classes of data. Thus, a polling policy can indicate that an email data store should be polled at a designated rate for a particular class of users, while also indicating that a security data store should be polled at a different rate for the same class of users.

Event detection module 129 can indicate one or more system events at the information handling system 102. Examples of system events can include an indication of a user interaction with the system, receipt of a message or other information at the network interface 126, or the like. For example, the user can trigger a system event by depressing a button. In response to the event, event detection module 129 provides a notification to the polling control module 130. The notification can provide an indication of the event type or the circumstances that triggered the event notification. In response, polling control module 130 can set the polling rate to a different value. Thus, for example, a user may depress a button to indicate that she wishes to interact with the information handling system 102. In response, the polling control module 130 can set the polling rate to an increased rate, so that the local data store 134 is updated more frequently. The user can thereby override the polling rate indicated by the usage characteristics described above.

In one embodiment, information handling system 102 can be placed in different power modes. For example, information handling system 102 can be placed in an active mode whereby it is able to communicate polling requests, and can be placed in a low-power mode, whereby it is able to maintain stored information but not communicate polling requests in to the network 110. In this embodiment, the information handling system 102, can be placed in the low-power mode between polling requests, and placed in the active mode in response to the indication from the polling control module that a polling request should be communicated. Thus information handling system 102 is not maintained in the active mode, but only placed in the active mode when a polling request is indicated, thereby conserving power. Further, because polling control module 128 can set the polling rate such that polling requests are sent less frequently (depending on particular usage characteristics of the information handling system 102) overall power consumption of the information handling system 102 can be reduced.

Figure 2:
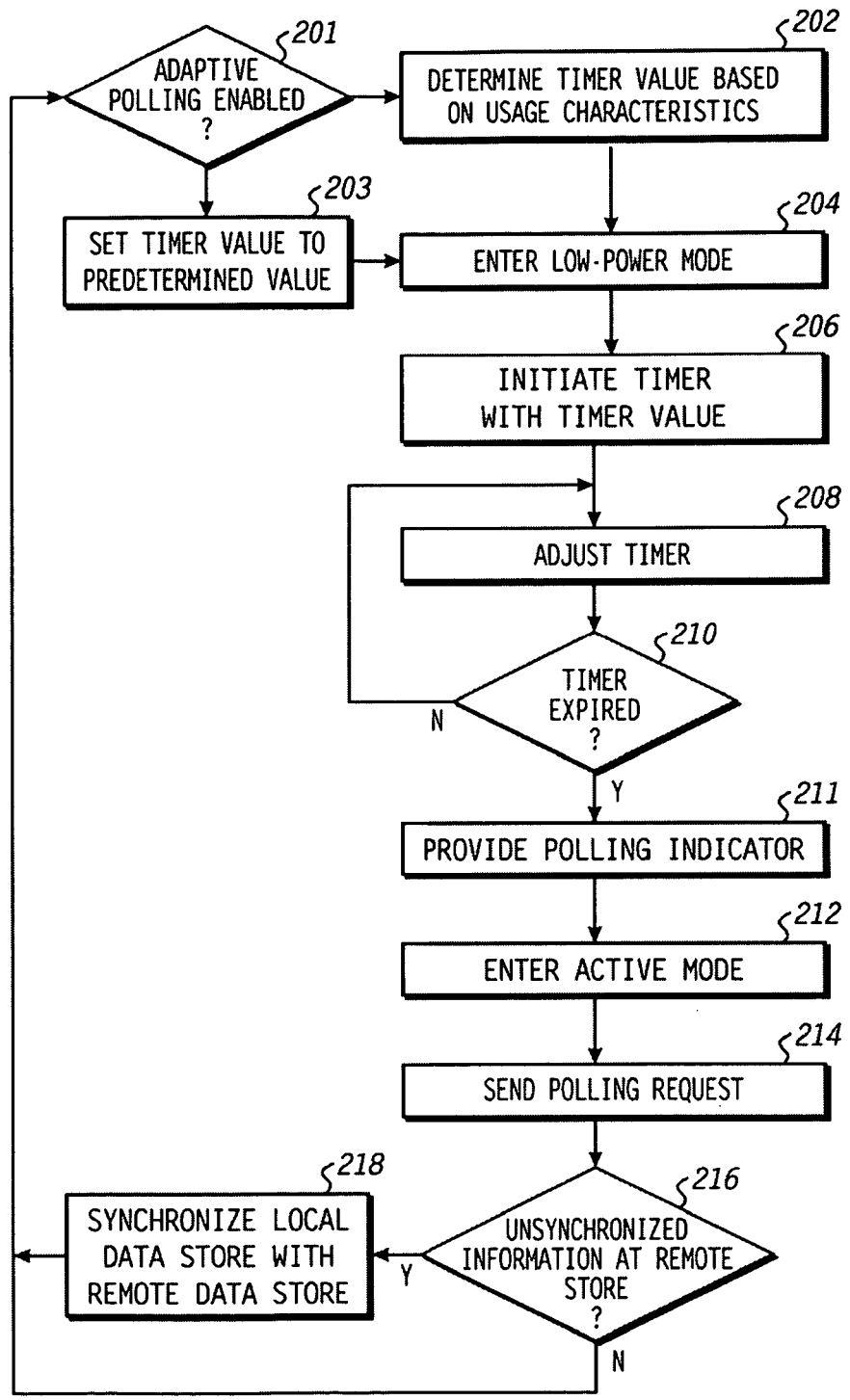
FIG. 2 illustrates a flow diagram of a method of polling a remote data store according to aspect of the present disclosure.

Referring to FIG. 2, a flow diagram of a method of polling a remote data store according to one embodiment of the present disclosure is illustrated. At block 201, the polling control module determines if adaptive polling is enabled. If so, the method flow moves to block 202, and the polling control module 128 determines an initial time value based on usage characteristics of the information handling system 102. At block 204, the network interface 126 and processor 122 enter a low-power mode. At block 206, the polling control module 128 initializes the timer 130 with the initial time value.

At block 208, the timer is adjusted based on a clock signal. The method flow moves to block 210, and the polling control module 128 determines whether the timer has expired. In an embodiment, polling control module 128 determines if the timer has expired by comparing a value stored at the timer to a threshold value. If polling control module 128 determines that the timer has not expired, the method flow returns to block 208 and the clock signal continues to adjust the timer.

In response to the timer expiring, the method flow moves to block 211 and the polling control module provides a polling indicator, such as an interrupt request, to the processor 122. In response, at block 212, the processor 122 and network interface 126 are placed in an active mode. At block 214, in response to the polling indicator, the processor 122 communicates a polling request to the network interface 126, which in turn communicates the polling request to the server 104.

At block 216, the server 104 determines if the remote data store 108 includes unsynchronized information with respect to the local data store 134. If not, the method flow moves to block 202 and the polling control module 128 again determines an initial time value for the timer 130. If remote data store 108 does include unsynchronized information, the method flow proceeds to block 218 and the server 104 synchronizes the local data store 134 with the remote data store 108. The method flow returns to block 201 and the polling control module 128 again determines if adaptive polling is enabled.

If, at block 201, the polling control module 128 determines that adaptive polling is not enabled, the method flow moves to block 203 and the polling control module 128 sets the timer value to a predetermined value. Thus, if adaptive polling is not enabled, the polling control module 128 will poll at a fixed rate based on the predetermined value, rather than polling at a rate based on usage characteristics of the information handling system 102.

Figure 3:
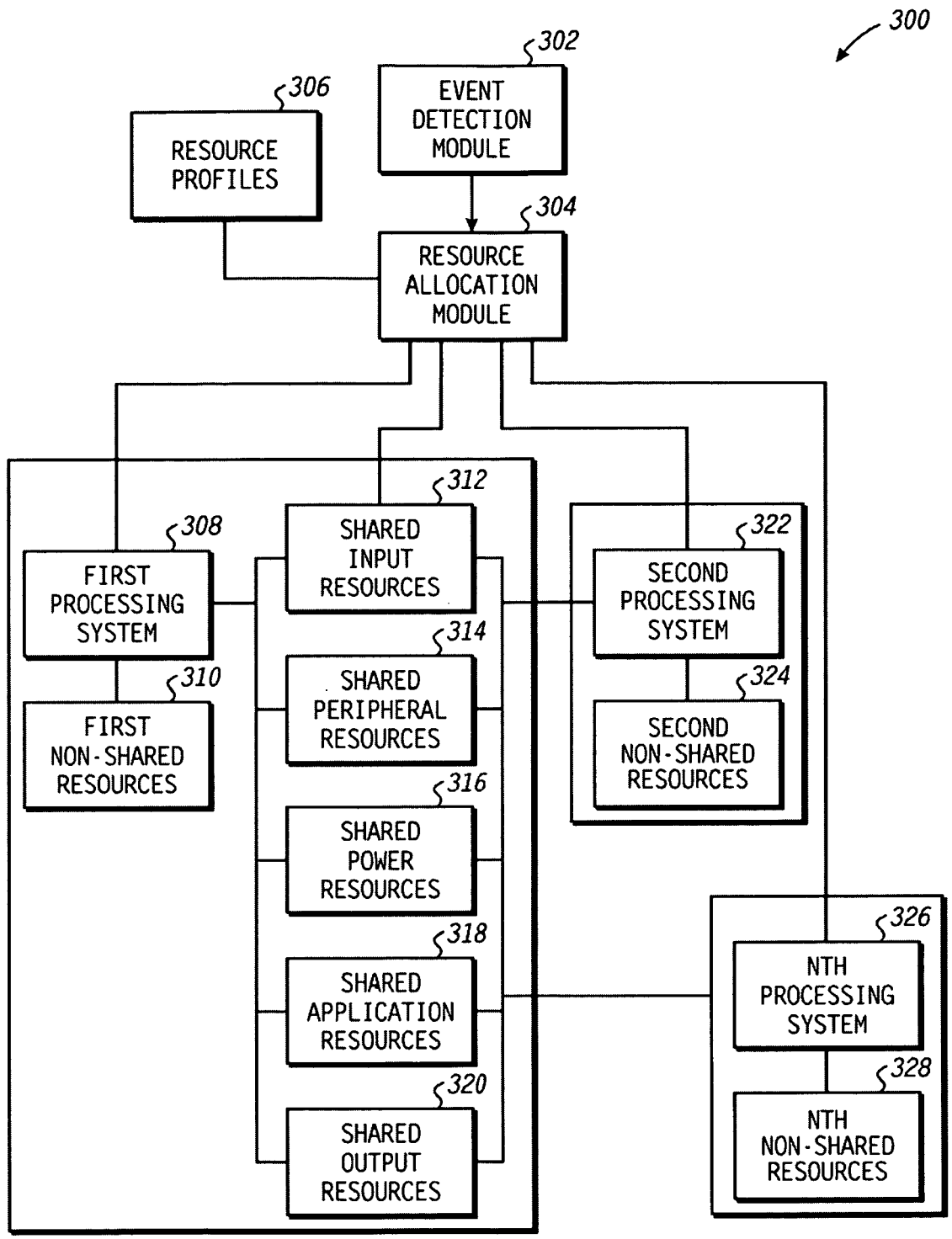
FIG. 3 illustrates a block diagram of an information handling system according to one aspect of the present disclosure.

FIG. 3 illustrates a block diagram of an exemplary embodiment of an information handling system, generally designated at 300. In one form, the information handling system 300 can be a computer system such as a desktop computer, notebook computer, server or various other types of information handling systems. As shown in FIG. 3, the information handling system 300 can include an event detection module 302 operable to detect user activated and non-user activated events. The event detection module 302 can be coupled to a resource allocation module 304 having access to one or more resource profiles 306. The information handling system 300 can also include a first processing system 308 coupled to first non-shared resources 310 of the first processing system 308. In one form, the first processing system 308 can include a host chipset, processor, memory, communication buses, peripheral devices, applications, a Basic Input/Output System (BIOS), or any combinations thereof (not illustrated). The first processing system 308 can also include shared resources including shared input resources 312, shared peripheral resources 314, shared power resources 316, shared application resources 318, shared output resources 320, or any combination thereof. The first processing system 308 can be coupled to the resource allocation module 304 operable to allocate shared resources to be used in response to an event detected by the event detection module 302, and one or more associated resource profiles 306. In one form, the shared resources 312, 314, 316, 318, 320, can be configured as a part of the first processing system 308 and accessible by one or more processing systems. In other forms, one or more of the shared resources can be provided external to the first processing system 304.

According to a further aspect, the information handling system 300 can also include a second processing system 322 including second non-shared resources 324. The second processing system 322 can be coupled to one or more of the shared resources 312, 314, 316, 318, 320 of the first processing system 308. The second processing system 322 can further be coupled to the resource allocation module 304 operable to allocate resources to be used by the second processing system 322. Additionally, the resource allocation module 304 can further be coupled to an $n^{th}$ processing system 326 operable to be coupled to one or more of the shared resources 312, 314, 316, 318, 320 of the first processing system 308. The $n^{th}$ processing system 326 can further include $n^{th}$ non-shared resources 328.

During operation, the event detection module 302 can detect a user initiated event, a non-user initiated event, or any combination thereof. For example, a user initiated event can include a user activating a key, button, or other type of hardware, software, or user selectable interface, or combinations thereof, that can generate a user activated event. For example, a user can select a button to access a messaging application of the information handling system 300. As such, the event detection module 302 can detect a request to access the messaging application and couple an event request to the resource allocation module 304.

According to another aspect, the event detection module 302 can detect a non-user initiated event. For example, the information handling system 300 can include a communication module (not illustrated) operable to receive communication signals via a wireless communication, terrestrial or wireline communication, or any combination thereof. The information handling system 300 can detect the non-user initiated event, and can couple an input identifying detection of the event to the resource allocation module 304. The resource allocation module 304 can identify a resource profile 306 using the detected event, and initiate activation of resources to process the non-user initiated event. For example, the resource profiles 306 can include a listing of desired resources of the first processing system 308, the second processing system 322, the nth processing system 326, or any combination thereof. The resource allocation module 304 can then initiate activation of resources based on the resource profile using the detected event, and resources available to process the event.

In one form, the information handling system 300 can detect a non-user initiated event communicated to an electronic device other than the information handling system 300. For example, the event detection module 302 can be configured to detect a message formatted to be received by a smart phone device, Blackberry device, or any type of electronic device configured to receive messages. For example, the information handling system 300 can include a communication module (not illustrated) operable to detect wireless messages communicated via any network operable to communicate messages. For example, a wireless messaging network such as an SMS network, Blackberry enabled network, or any other type of messaging enabled wireless or wireline network. According to an aspect, the event detection module 302 can couple a detected input to the resource allocation module 304 indicating that a Blackberry formatted (or other format) message has been detected. As such, the resource allocation module 304 can access the resource profiles 306 and determine a resource profile of the event and initiate allocation of resources to process the Blackberry message.

In an exemplary form, the information handling system 300 can be operating in a low-power operating state that can include sufficient resources to detect a wireless signal. As such, the resource allocation module 304 can determine the current operating state of the information handling system 300, and initiate enabling resources, such as a second processing system 322, shared input resources 312, shared power resources 316, shared application sources 318, shared output sources 320, or any combination thereof to process and output a response to the received wireless signal. As such, an operating environment to output a response to a message, such as a Blackberry message, can be enabled using a limited amount of resources without having to initialize additional resources of the information handling system 300. For example, a shared peripheral resource 314 such as a display can be accessed to output the message using the second processing system 322. Additionally, a keyboard or other input device of the first processing system 308 can be powered to enable a user to respond to the message. As such, a limited resource operating environment can be generated to allow for receipt and response to messages without having to power the entire information handling system 300. In the manner, a laptop or notebook system can be used to receive messages that may be intended for a Blackberry or other type of messaging device, thereby allowing a user to view messages using a larger display relative to the Blackberry device or smart phone device, and draft and respond to messages using a keyboard and display of a portable or notebook system and associated input devices as desired.

Further, in the illustrated embodiment, either processing system 308 or processing system 322, or both, can include a polling control module as described above with respect to FIGS. 1 and 2. Thus, either processing system can poll a remote data store based on a usage characteristic of the processing system. Further, the polling rate associated with each processing system can be set according to the usage characteristics associated with that system. Moreover, when one of the processing systems sends a poll request, the other processing system can be placed or remain in a low-power mode, thereby conserving power consumption for the information handling system 300.

Figure 4:
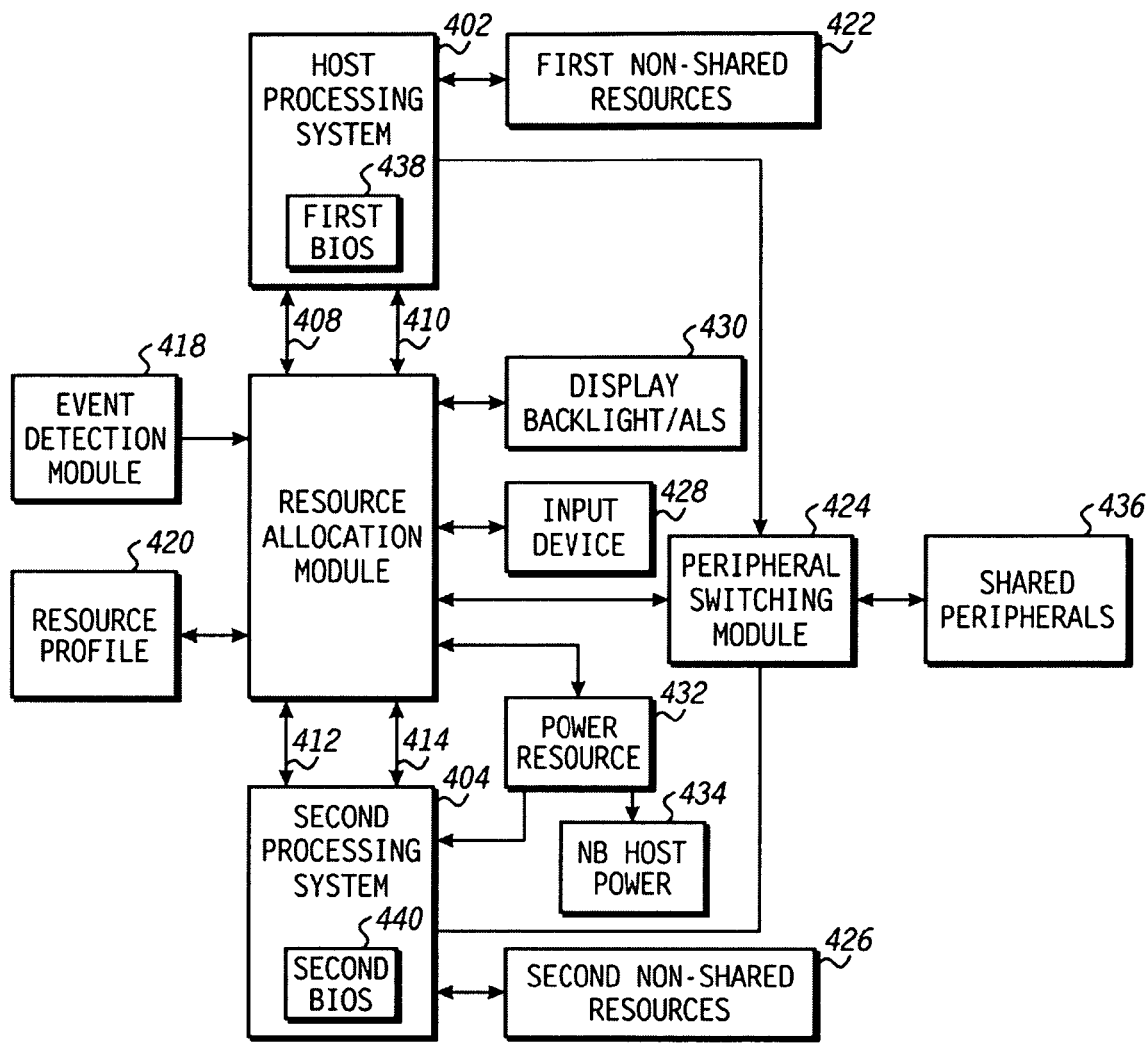
FIG. 4 illustrates a block diagram of an information handling system according to another aspect of the present disclosure.

FIG. 4 illustrates a functional block diagram of an information handling system 400 operable including allocated resources according to one aspect of the disclosure. The information handling system can include a host processing system 402 that can include a host CPU, a host CPU chipset, memory, a host operating system. The host processing system 402 can also include a first BIOS 438 operable to enable resources accessible to the host processing system 402. The information handling system 400 can also include a second processing system, illustrated generally as second processing system 404, that can include an auxiliary CPU, a auxiliary CPU chipset, auxiliary memory, and an auxiliary operating system. The second processing system 404 also includes a second BIOS 440 operable to enable resources accessible to the second processing system 404. In one form, the second processing system 404 can include BIOS extensions or input that can be commonly used by the host processing system 402.

According to an aspect, the host processing system 402 and the second processing system 404 can be coupled to a resource allocation module 406. For example, the host processing system 402 can be coupled to the resource allocation module 406 using a first bus 408 and a second bus 410. In one form, the first bus 408 can include a low pin count (LPC) bus and the second bus can include a system management bus (SMBUS). Additionally, the second processing system 404 can be coupled to the resource allocation module 406 using a third bus 412 and a fourth bus 414. In one form the third bus 412 can include a PS2 bus, an RS232 bus, an SPI bus, or other types of buses. In another form, the fourth bus 414 can include an SMBUS, or other type of bus as desired.

The information handling system 400 can also include an event detection module 418 coupled to the resource allocation module 406 and a resource profile source 420 stored within a memory and accessible to the resource allocation module 406. The host processing system 402 can also be coupled to first non-shared resources 422 and a peripheral switching module 424. The second processing system 402 can be coupled to second non-shared resources 426 and the peripheral switching module 424. The resource allocation module 406 can also be coupled to an input device 428, such as a keyboard, pointing device, or combinations thereof. The resource allocation module 406 can also be coupled to a display 430 such as flat screen or flat panel display that can include a backlight and ambient light sensing (ALS) capabilities. The resource allocation module 406 can further be coupled to a power resource 432 operable to power the second processing system 404 and to output host processing power 434. The peripheral switching module 424 can further be coupled to one or more shared peripherals 436.

Further, in the illustrated embodiment, either the host system 402 or second processing system 404 can include a polling control module as described above with respect to FIGS. 1 and 2. Thus, either processing system can poll a remote data store based on a usage characteristic of the processing system. Further, the polling rate associated with each processing system can be set according to the usage characteristics associated with that system. Moreover, when one of the processing systems sends a poll request, the other processing system can be placed or remain in a low-power mode, thereby conserving power consumption for the information handling system 400. Thus, for example, the network interface 126 can be one of the shared resources 436. In response to an indication from the polling control module of the second processing system 404, the network interface 126 can be placed in a power mode to allow a polling request to be communicated, while maintaining other shared resources and non-shared resources 422 to be maintained in a low-power state, thereby conserving power.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
communicating a first polling request to a remote device via a network, the first polling request to determine whether a remote data store includes information not stored at a local data store of an information handling system;
in response to communicating the first request:
determining a first time duration based on a variable usage characteristic of the information handling system, and based on a geographic location of the information handling system, wherein the first time duration is longer when the geographical location of the information handling system is a first location than when the geographical location of the information handling system is a second location;
initiating a first timer; and
in response to the first timer indicating the first time duration has elapsed, communicating a second polling request to the remote device, wherein the first time duration is a polling rate of the information handling system.

2. The method of claim 1, wherein the variable usage characteristic is based on a user profile associated with a user of the information handling system.

3. The method of claim 1, wherein the variable usage characteristic is based on a historical usage pattern associated with the information handling system.

4. The method of claim 1, wherein the variable usage characteristic is programmable by a user.

5. The method of claim 1, wherein the variable usage characteristic is associated with a group of users.

6. The method of claim 1, wherein the variable usage characteristic is based on one of a plurality of user classes.

7. The method of claim 1, further comprising:
in response to communicating the first request, placing the information handling system in a low-power mode;
in response to the first timer indicating the first duration has elapsed, placing the information handling system in an active mode to communicate the second polling request; and
in response to communicating the second polling request, returning the information handling system to the low-power mode.

8. A non-transitory computer readable medium tangibly embodying of program of instructions to manipulate a processor, the program of instructions comprising instructions to:
determine a first polling rate based on a first usage characteristic of an information handling system;

poll a remote data store at the first rate to determine whether the remote data store includes information not stored at a local data store of the information handling system;

adjust the first polling rate based on a change in the first usage characteristic to determine a second polling rate, wherein the change in the first usage characteristic is a change in a geographic location of the information handling system; and poll the remote data store at the second rate in response to the change in the first usage characteristic.

9. The non-transitory computer readable medium of claim 8, wherein the instructions to poll the remote data store comprise instructions to:

place the information handling system in an active mode;

communicate a poll request when the information handling system is in the active mode;

place the information handling system in a low-power mode in response to receiving an answer to the polling request.

10. The non-transitory computer readable medium of claim 8, wherein the information handling system comprises a first processing system and a second processing system.

11. The non-transitory computer readable medium of claim 8, wherein the first usage characteristic is based on a user profile associated with a user of the information handling system.

12. The non-transitory computer readable medium of claim 8, wherein the first usage characteristic is indicative of a geographic location of the information handling system.

13. The non-transitory computer readable medium of claim 8, wherein the first usage characteristic is indicative of a time of day.

14. The non-transitory computer readable medium of claim 8, wherein the instructions to determine the first polling rate comprises determining the first polling rate based on a second usage characteristic of the information handling system.

15. The non-transitory computer readable medium of claim 8, wherein the remote data store comprises an email data store.

16. An information handling system, comprising:

a memory configured to store first information associated with a first usage characteristic of the information handling system, wherein the first usage characteristic provides an indication of how often a local data store of the information handling system is accessed at different times of a day;

a polling module configured to determine a polling rate based on the first information associated with how often the local data store is accessed, based on a geographic location of the information handling system, and based on time information; and a network interface configured to communicate polling requests to a network based on the polling rate, wherein the polling requests determine whether a remote data store includes information not stored at a local data store of the information handling system.

17. The information handling system of claim 16, wherein the memory is further configured to stored second information associated with a second usage characteristic of the information handling system and wherein the polling module is configured to determine the polling rate based on the first information and the second information.

18. The information handling system of claim 16, wherein the first usage characteristic is based on a user profile associated with a user of the information handling system.

* * * * *